Oct. 19, 1926.

A. L. JOHNSTON, JR 1,603,389

SELF LOCKING CONNECTING LINK

Filed April 11, 1921

INVENTOR
A. L. Johnston Jr.
BY
Duell, Warfield & Duell
ATTORNEY

Patented Oct. 19, 1926.

1,603,389

UNITED STATES PATENT OFFICE.

ANDREW LANGSTAFF JOHNSTON, JR., OF NEW YORK, N. Y., ASSIGNOR, BY MESNE ASSIGNMENTS, TO OFF'N'ON CHAIN CORPORATION, OF NEW YORK, N. Y., A CORPORATION OF DELAWARE.

SELF-LOCKING CONNECTING LINK.

Application filed April 11, 1921. Serial No. 460,191.

This invention relates to anti-skid chains for automobile tires and more particularly to fastening devices for joining the ends of the side chains.

It is an object of the invention to provide reliable and efficient anti-skid chains capable of quick and easy application to a tire.

It is another object of the invention to provide a simple and secure self-locking fastening device for tire chains.

It is a further object of the invention to provide a fastening link which is easy of operation, efficient in use and inexpensive to manufacture.

Other objects will be in part obvious and in part pointed out hereinafter.

In the accompanying drawings wherein is illustrated a preferred embodiment of the invention, Figure 1 is a fragmentary side view of the chain in use on a tire;

Figure 1:
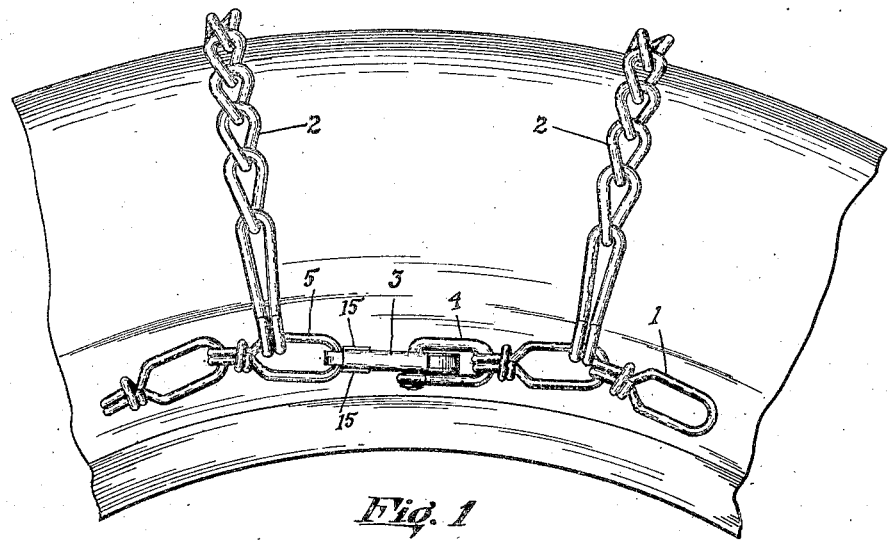

The invention concerns principally a fastening device for connecting the free ends of a circumferential side chain commonly employed in anti-skid apparatus. As illustrated, the general arrangement of parts is similar to standard devices for the prevention of skidding. Two circumferential side chains 1, (of which one only is shown), adapted to fit closely against an automobile tire are joined by a series of cross chains 2 which in use encircle the tread of the tire and furnish ground gripping means for avoiding slipping. The links of the side chains may be of any suitable construction and a preferred form is illustrated in which each link is formed from a single strand of chain wire bent into a large loop, the free ends of which are further looped to form eyes and bent to reinforce the necks of the eyes. The cross chains may be of suitable standard construction. By the present invention an improved link 3 is provided for connecting the free ends of the side chains 1 especially of that side chain illustrated which lies on the outside of the wheel and which is ordinarily fastened last. In the present embodiment the fastening link 3 is adapted to be permanently carried by a connecting link 4 of the chain 1 and to detachably engage the opposite terminal link 5 of the side chain.

Figure 2:
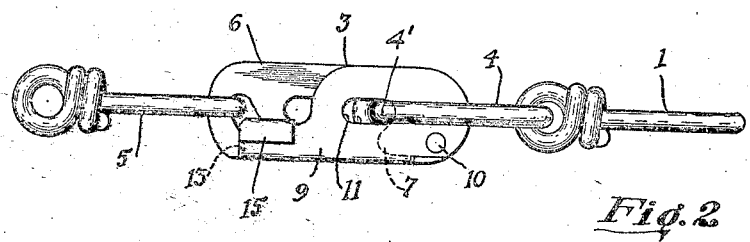
Fig. 2 is a side view of the improved fastening link taken from above in Figure 1
Figure 3:
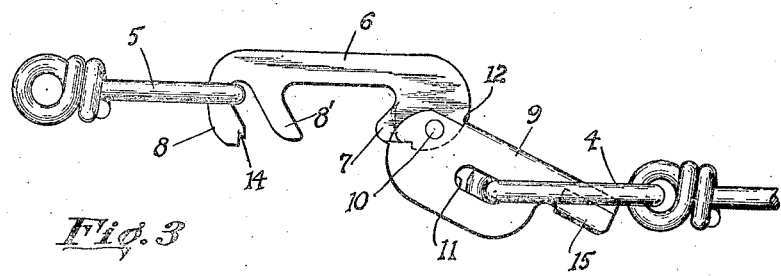
Fig. 3 is a similar side view of the link in open condition.

As shown best in Figs. 2 and 3, the fastening link includes a rigid hook member 6 having oppositely directed hooks 7 and 8 for engaging links 4 and 5 of the side chain. Supplementary hooks may be provided for adjustment as for example in the form of the hook 8' as shown.

A closing member or keeper 9, channel shaped in cross-section, is pivotally carried by the hook 6 by means of a pin or rivet 10 and has opposed slots 11 in the walls thereof located at the same distance from the pin 10 through which the transverse connecting strand 4' of the connecting link 4 of the side chain may be threaded, these slots being open or closed but preferably closed as shown. It will be noted from the drawing that the closure member or keeper 9 has spaced walls adapted to overlap the sides of the hook member 6, the opposed slots 11 in the walls providing an elongated seat for receiving the connecting strand 4' which extends between said walls providing a means for connecting the end of the chain to the keeper. This arrangement also provides a lost motion connection between the link 4 and the keeper 9 whereby these parts are bodily movable with reference to each other. The purpose of this lost motion connection is more fully described below.

The pivot pin 10 is located adjacent an end of the connecting link and is offset from the center line or line of strain caused by tension on the chain. When the link is in its closed position as in Fig. 2, the chain link 4 is drawn back through the slot 11 by the normal pull of the chain and the strain is borne principally by the hook 7 of the comparatively heavy member 6. Tension on the chain resists opening pivotal movement of the member 9 by reason of the offset disposition of the pivot pin 10 and further locks the parts in closed position by restraining the link 4 from movement to the left within the slot 11 necessary to avoid the projecting hook 7.

In completing the application of anti-skid chains to a tire it is ordinarily necessary to exert considerable tension on the side chains and the present invention serves to facilitate the closure of the side chains by providing a leverage action in the process of engaging one of the links with one of the hooks and to provide a construction in which the link when engaged shall be locked in position by operative tension on the chain in use. Accordingly, the process of closure proceeds in the manner to be described. The link 5 of the side chain is first thrown over the hook 8 (or over the hook 8') and the hook closing member 9 is then pivotally moved on the pin 10 from the open position of Fig. 3 to the closing position of Fig. 2 over the entrances to the hooks thus acting as a lever to exert a tightening tension on the side chain. In this closing movement of the keeper 9 the link 4 is directed into engaging position with the hook seat of the hook 7, the transverse strand 4' riding over the curved nose of the hook 7 which thus acts as a cam to move the link 4 forwardly in the slots 11. The link then passes into its seat in the hook. The pivotal motion of the member 9 is preferably positively limited in both directions, to the rear as in Fig. 3 by the extremity 12 against the end of the member 6 and in its closed position by the abutting of the end 13 of the link 9 on a cooperating surface 14 of the hook 8. When closed as in Fig. 2 tension on the side chain 1 incident to the normal operative strain on various parts of the chains keeps the transverse connecting strand of the connecting link 4 in retracted position for engagement with the overlying part of the hook 7 so as to lock the hook closing member 9 in closed position. In this position as shown in Fig. 2 the tension of the chain is transferred from the hook closing member to the seat of the hook 7 underlying the overlying part thereof. This overlying part of the hook thus forms a hook nose laterally offset from the hook seat and cooperating with the link strand 4' to retain the keeper 9 in closed position. The keeper is thus doubly secured in hook closing position by chain tension incident to the offset pivotal connection 10 and by cooperation of the link strand with the overlying hook nose. In the embodiment shown the member 9 is of thin material and is bent into a form channel or U-shaped in section to straddle the link 6 when closed. Lugs 15 adjacent the free end of the member 9 assist in opening and closing the device. As has been described the placement of link 4 within hook 7 is assisted by leverage of the member 9 and its disengagement is effected by first sliding the link 4 within the slot 11 to the left in Fig. 2 so as to be moved clear of the hook 7, whereupon the member 9 may be swung on its axis 10 outwardly, thus relieving the tension on the chain and allowing convenient disengagement of the link 5 from the hook 8.

It will be noted that a construction is provided which possesses improved features cooperative to assist the engagement of the links of the chain with the fastening hook against tension on the chain and to ensure a securely locked condition when the chain is in use.

Since certain alterations in the above construction might be made without departing from the spirit of the invention or sacrificing its advantages, it is intended that all matter contained in the above description or shown in the accompanying drawings shall be interpreted as illustrative and not in a limiting sense.

Having described my invention, what I claim is new and desire to secure by Letters Patent is:

1. In a connecting device, in combination, a hook member having oppositely directed hooks adapted to receive links of a chain or the like and a hook-closing member movably connected to said hook member, one of said links having a lost-motion connection with said hook closing member and being adapted to engage with one of said hooks to hold said hook-closing member in closing position, said hook closing member being adapted to direct said last mentioned link into its hook when moved to closed position and to positively carry said link from its seat when moved toward open position.

2. In a self locking connecting device, in combination, a hook member for detachable attachment of the ends of a chain, said hook member having oppositely directed open hooks with seats arranged substantially on the axis of the hook member and an overlying part for one of said seats, a hook closing member connected for pivotal movement on said hook member and foldable thereon, said hook closing member having spaced walls arranged to overlap the sides of said hook member and adapted to close said hooks when in folded position, connecting means extending to points intermediate the walls of said closing member for permanently connecting one end of the chain thereto, said connecting means being removed from said pivotal connection so as to exert a pull on the chain, when the closing member is moved toward closing position, and to carry said connecting means into position for seating in one of said hooks, said connecting means being bodily movable longitudinally of said hook member under chain tension into position to cooperate with said seat overlying part to lock said closure member against pivotal movement.

3. In a self locking connecting device in combination, a hook member having oppositely directed open hooks providing hook seats arranged substantially on the longitudinal axis thereof for detachable attachment of a chain or the like, a hook closing member connected for pivotal movement on said hook member and foldable thereon, said hook closing member having spaced walls arranged to overlap the sides of said hook member and being adapted to close said hook when in folded position, connecting means extending to points intermediate the walls of said closing member for connecting said chain thereto, said connecting means being removed from said pivotal connection so as to exert a pull on the chain when the hook closing member is moved toward closing position, and to carry the connecting means into position for seating in one of said hook seats, or to positively carry it from its hook seat when moved in opening direction, said connecting means being bodily movable longitudinally of said hook member under chain tension into position to cooperate with the corresponding hook to lock said closing member in closed position.

4. In a device of the character described, in combination, a chain having free ends and a connecting link therefor comprising a member having hooks with seats arranged substantially at the longitudinal axis of said member for detachably connecting said chain, and a hook closing member pivotally connected to said member adjacent an end at a point offset from said axis and permanently carrying a link of said chain, said second member being adapted to exert a tightening tension on said chain by leverage in closing and adapted to be removably held in closing position by engagement of said carried chain link with one of said hooks.

5. In a device of the character described, in combination, a chain having free ends and a connecting link therefor comprising a member having hooks with seats arranged substantially at the longitudinal axis of said member for detachably connecting said chain and a hook closing member pivotally connected to said member at a point offset from said axis and having means to limit pivotal motion in both directions, said second member being operative as a lever to exert a tightening tension on said chain and to effect engagement of a chain link with one of said hooks upon pivotal motion to close the entrances to said hooks and being adapted to be locked in closing position by operative strain of said chain on said hooks.

6. In a self locking connecting device, in combination, a hook member for detachable attachment of opposed connecting links of a chain or the like and having oppositely directed receiving hooks providing hook seats arranged substantially on the longitudinal axis of the hook member, one of which is provided with an overlying cam nose, and means for locking said links in engagement with said hook seats including a guard member connected for pivotal movement to said hook member near the end thereof proximate to said hook seat with the overlying cam nose and being swingable upon said hook member from open position to close the entrances to said hook seats, one of said link connections being freely initially receivable when the guard member is open in the hook seat remote from said cam nose, and remaining permanently thereing while the guard member is in closed position, and a second link connection having a permanent connection with said guard member to positively carry it to and from its hook seat when said guard member is swung on said hook member, said second link connection being positioned on said guard member to contact with said cam nose when the guard member is swung, whereby, when the guard member is swung to hook closing position, a tensioning effect is exerted and the permanently connected link is cammed forwardly by said cam nose and directed thereby into the adjacent hook seat into which it may pass under chain tension, the guard member then being held in closed position by cooperation of said permanent connection with said overlying cam nose.

7. In anti-skid chains for automobile tires, in combination, means for joining the ends of a side member of said chain comprising a foldable link consisting of a member having oppositely directed open hooks adapted to engage links of said side member and a guard member pivotally connected to said hook member adjacent an end, at a point offset from the center line of said hook member, and having a slot adapted to carry a loop of a chain link, said guard member being adapted to act as a lever to exert tightening tension on said side chain upon pivotal motion on said hook member whereby said link carried thereby is looped over one of said hooks, said guard member being adapted to close the entrance to said hooks and to be locked in closing position by operative strain of said link carried thereby against said engaged hook.

8. In a self locking connecting device, in combination, a hook member for detachable attachment of chains or the like and having an open hook providing a hook seat disposed substantially on the longitudinal axis thereof, and having a cam nose overlying said hook seat, a keeper connected for pivotal movement upon said hook member and being foldable thereon and adapted to close said hook when in folded position, said keeper being formed to provide an elongated slot disposed substantially on the longitudinal axis of the hook member when the keeper is in folded position and adapted for the reception of a chain connecting link, said slot being removed from said pivotal connection so as to exert a tensioning effect on the chain when the keeper is being folded and to direct said connecting link into said hook seat to transfer chain tension thereto, said connecting link when the keeper is being folded riding over said cam nose and thereby cammed forwardly and being directed under chain tension into the hook seat, said connecting link when seated cooperating with said hook and a side wall of the elongated slot in said keeper to retain said keeper in closed position.

9. In a self locking connecting device, in combination, a hook member for detachable attachment of a chain or the like having an open hook providing a hook seat disposed substantially on the longitudinal axis thereof, and having a hook nose disposed laterally from and overlying said hook seat, a keeper connected for pivotal movement on said hook member being foldable thereon and adapted to close said hook when in folded position, said keeper having an elongated seat for the reception of a chain connecting link and being removed from said pivotal connection so as to direct said connecting link into said hook seat and to transfer chain tension thereto, said elongated seat being so disposed that the connecting link under chain tension normally lies at one extremity thereof when the keeper is in open position, and at the opposite extremity when the keeper is closed so as to underlie said hook nose and cooperate therewith to hold said keeper in closed position, said keeper when moved toward open position being also adapted through its elongated seat to positively carry said connecting link away from said hook.

10. In a self locking connecting device, in combination, a hook member for detachable attachment of a chain or the like having an open hook providing a hook seat disposed substantially on the longitudinal axis thereof, and having a hook nose disposed laterally from and overlying said hook seat, a keeper connected for pivotal movement at a region on said hook member laterally disposed from said longitudinal axis and being foldable thereon and adapted to close said hook when in folded position, said keeper having an elongated seat for the reception of a chain connecting link and being adapted to direct said connecting link into said hook seat and to transfer chain tension thereto, said elongated seat being so disposed that the connecting link under chain tension normally lies at one extremity thereof when the keeper is in open position, and at the opposite extremity when the keeper is in closed position so as to underlie said hook nose and to hold said keeper closed, through action of chain tension and by cooperation with said hook nose, said keeper when moved toward open position also being adapted through its elongated seat to positively carry said connecting link away from said hook, and a stop adjacent the connection between said hook member and keeper for limiting the opening movement of the latter.

11. In a self locking connecting device, in combination, a hook member for detachable attachment of chains or the like and having an open hook with a hook seat disposed substantially on the longitudinal axis of the hook member, and having a cam nose laterally disposed from and overlying said hook seat, a keeper connected for pivotal movement at a region on said hook member laterally disposed from said longitudinal axis and being foldable on said hook member and adapted to close said hook when in folded position, said keeper being substantially channel shaped and adapted to lap one edge and the sides of said hook member, and the spaced walls thereof being provided with opposed elongated seats for the reception of a chain connecting link so as to cam the latter forwardly over said cam nose and to direct it into said hook seat when the keeper is moved towards closed position, and said chain connecting link cooperating with said elongated seats to positively carry the link away from said hook when the keeper is moved toward open position, said connecting link under chain tension normally engaging with corresponding ends of said opposed elongated seats when the keeper is in open position, and engaging with opposite ends thereof when in closed position to hold the keeper closed.

12. In a self locking connecting device, in combination, a hook member for detachable attachment of chains or the like having an open hook providing a hook seat disposed substantially on the longitudinal axis thereof, and having a hook nose disposed laterally from and overlying said hook seat, a keeper connected for pivotal movement at a region on said hook member laterally disposed from said longitudinal axis and being foldable on said hook member and adapted to close said hook when in folded position, said keeper being substantially channel-shaped and adapted to lap one edge and the sides of said hook member, and the spaced walls thereof being provided with opposed elongated seats for the reception of a chain connecting link so as to direct the latter into said hook when the keeper is moved toward closed position and to positively carry it away from said hook when moved toward open position, said connecting link under chain tension normally engaging with corresponding ends of said seat when the keeper is in open position, and engaging with the opposite ends thereof when in closed position so as to underlie said hook nose and to hold the keeper closed through action of chain tension and by cooperation with said hook nose and a stop adjacent the connection between said hook member and keeper for limiting opening movement of said keeper.

13. In a self locking connecting device, in combination, a hook member for detachable attachment of a chain or the like having oppositely directed open hooks providing hook seats disposed substantially on the longitudinal axis thereof, a keeper connected for pivotal movement on said hook member and being foldable thereon so as to close said oppositely directed hooks when in folded position, said keeper having oppositely directed operating lugs near the free end thereof and being substantially channel-shaped so as to lap one edge and the sides of said hook member and the spaced walls thereof being provided with opposed elongated closed seats for the reception of a chain connecting link and being removed from said pivotal connection so as to exert a tensioning effect when the keeper is moved toward closed position and to direct said connecting link into one of said hook seats and to transfer chain tension thereto, said keeper when moved toward open position being adapted positively to carry the connecting link away from its hook, said connecting link under chain tension normally engaging with corresponding ends of said seats when the keeper is in open position and engaging with the opposite ends thereof when in closed position so as to hold the keeper closed.

14. In a connecting device for chains or the like, in combination, a hook member having a hook providing a hook seat disposed substantially on the longitudinal axis thereof for the reception of a connecting link and having a hook nose disposed laterally from and overlying said hook seat and a hook closing member pivotally connected to said hook member, said hook closing member being channel shaped so as to close the sides and top of the hook and having spaced elongated closed slots for receiving and positively connecting said link and providing an elongated seat therefor, said closing member through said elongated seat being adapted to exert a tensioning effect on the chain and to direct the connecting link into registry with the hook seat when the hook closing member is moved toward closed position, and positively to carry it away from the hook when moved toward open position, said elongated seat being so disposed that the link under chain tension normally lies at one extremity thereof when the hook closing member is in open position and at the opposite extremity when the hook closing member is closed, said slots being disposed inwardly from the pivotal connection of said hook member and closing member and approximately coinciding with the axis of the hook member when the closing member is in closed position, said connecting link underlying said hook nose and cooperating with a terminal of said elongated seat and with said hook nose to retain the hook closing member in closed position, said hook member having an open hook seat opposing said first mentioned hook seat for detachably receiving a connecting link of the chain and being closed by said closing member when the latter is in closed position.

In testimony whereof I affix my signature.

ANDREW LANGSTAFF JOHNSTON, Jr.